United States Patent
Ortega Rodriguez et al.

(10) Patent No.: US 6,816,501 B2
(45) Date of Patent: Nov. 9, 2004

(54) METHOD AND SYSTEM FOR MAPPING CHANNELS INTO A CONVOLUTIONAL ENCODED TIME DIVISON MULTIPLEX IN THE DOWNLINK

(75) Inventors: Fernando Ortega Rodriguez, Madrid (ES); Josep Prat Aparicio, Madrid (ES); Mª Africa Rodriguez Martinez, Madrid (ES)

(73) Assignee: Alcatel, Paris (FR)

( * ) Notice: Subject to any disclaimer, the term of this patent is extended or adjusted under 35 U.S.C. 154(b) by 813 days.

(21) Appl. No.: 09/809,138

(22) Filed: Mar. 16, 2001

(65) Prior Publication Data

US 2001/0033578 A1 Oct. 25, 2001

(30) Foreign Application Priority Data

Mar. 17, 2000 (ES) .......................................... 200000649

(51) Int. Cl.[7] .............................................. H04B 7/212
(52) U.S. Cl. ........................................ 370/442; 370/535
(58) Field of Search ................................. 370/442, 535; 714/755

(56) References Cited

U.S. PATENT DOCUMENTS 5,983,383 A * 11/1999 Wolf .......................... 714/755

* cited by examiner

*Primary Examiner*—Salvatore Cangialosi
(74) *Attorney, Agent, or Firm*—Sughrue Mion, PLLC

(57) ABSTRACT

Method and system for mapping channels into a convolutional encoded time division multiplex in the downlink. In a transmission system comprising a plurality of stations, each station transmits in at least one channel, forming a plurality N of uplink channels that are transmitted, at an uplink information bit rate Ru, towards a destination station. Said destination station transmits in at least one downlink channel at a downlink information bit rate Rd, in such a manner that the relation Rd=N*Ru is satisfied. The number of the uplink channels N varies as a function of a change in a convolutional code rd applied to the downlink channel, so that N is an integer multiple of said variable convolutional code rd.

6 Claims, 1 Drawing Sheet

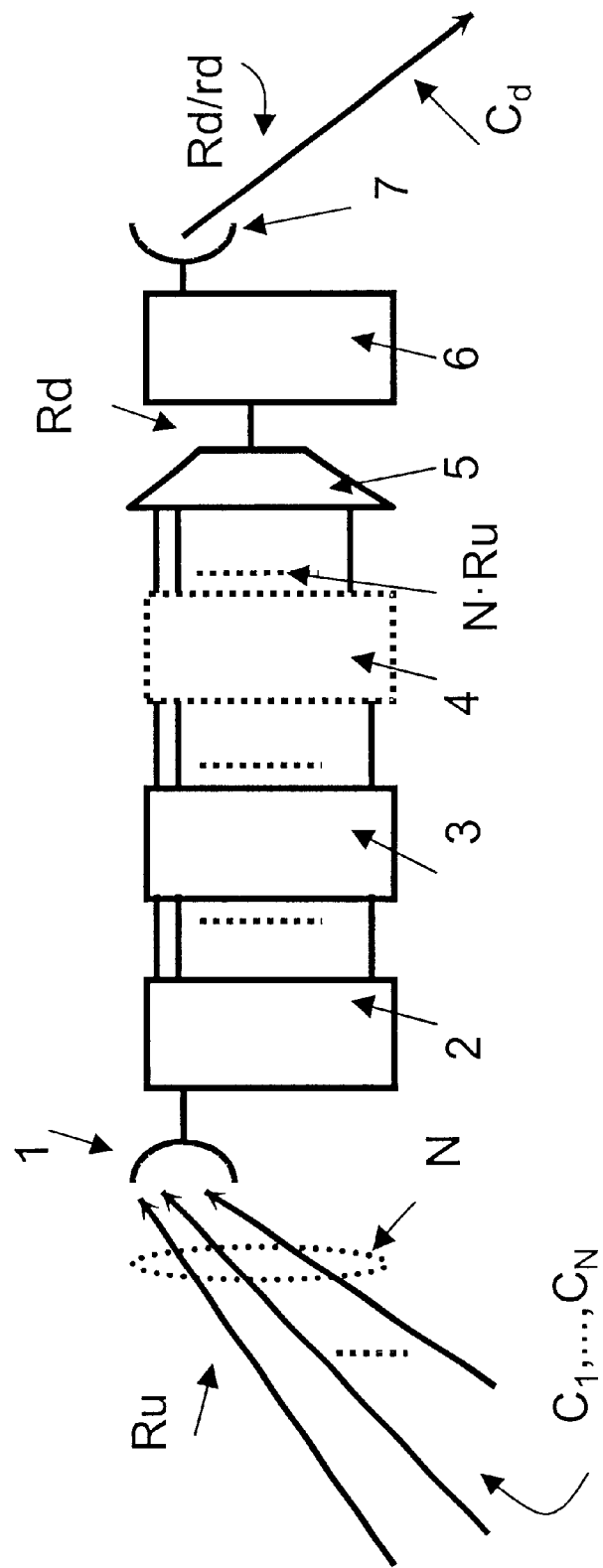

METHOD AND SYSTEM FOR MAPPING CHANNELS INTO A CONVOLUTIONAL ENCODED TIME DIVISON MULTIPLEX IN THE DOWNLINK

The present invention relates to a method and a system for mapping channels, typically uplink channels, into a convolutional encoded time division multiplex (TDM) in the downlink, applicable in transmission systems in general and in transmission via satellite in particular. An example of a transmission system via satellite is based on the use of a standard digital transmission format known as DVB (Digital Video Broadcasting) in which the TDM mode is employed as the transmission mode with convolutional code protection.

BACKGROUND OF THE INVENTION

In a satellite communication system the transmission in the uplink direction is carried out normally using the transmission mode known as CW/TDMA (Continuous Wave/Time Division Multiple Access). In this type of transmission the data are transmitted in the uplink direction from a plurality of transmission sources, for example from a series of ground stations, up to the satellite; each transmission source using at least one transmission channel. On the other hand, said data are sent from the satellite in the downlink direction in TDM format at a constant bit rate and with a variable convolutional protection code.

The information bit rate is measured as the number of information bits transmitted per second. In the uplink direction this rate is different to the rate in the downlink direction in such a way that in a symmetrical transmission, that is when the total information flow in the uplink direction is equal to the same flow in the downlink direction, the following relation $N*Ru=Rd$ is satisfied, where N is the number of uplink transmission channels, Ru is the uplink information bit rate and Rd is the downlink information bit rate.

However, in the transmission in the downlink direction the effect of the convolutional codes intervenes, said convolutional codes being some codes for protection against errors that add redundancy, the application of which is known in the art related with the invention.

In practice, the transmission rate in the downlink direction is maintained at a constant value, said value in turn depending on the values corresponding to the convolutional codes and the information bit rate in the downlink direction. Consequently, as shall be explained below, any change in said convolutional code shall necessarily change the value of Rd, which in turn shall compel the aforementioned relation to be changed. These changes in practice give rise to problems in the operation of the system since they can mean that the equipment hardware is made noticeably more complex, a problem that is of particularly significant importance in satellites, since it not only considerably increases the fabrication costs, but also produces problems of weight by increasing the satellite equipment payload.

A known solution for overcoming the aforementioned drawbacks proposes that in the case of a change in the convolutional codes, a consequence of which is a change in the downlink information bit rate Rd, a change is made in turn in the uplink information bit rate Ru, in relative proportion to said change in the downlink information bit rate Rd. The number of uplink transmission channels N shall be kept fixed and consequently the relation $N*Ru=Rd$ shall not suffer variation.

The problem associated with this solution is that a change in the uplink information bit rate Ru would make it necessary to effect this same change in all the stations transmitting in the uplink direction. This problem can give rise to loss of synchronisation and shall in turn require new processes for acquisition of synchronisation and the subsequent resumption of normal transmission for all the users. Consequently, each change in code shall introduce necessarily an additional start-up time in the operation of each transmission station. Moreover, the known solution shall also make necessary the use of as many clocks or, in other words, working frequencies, as there are convolutional codes in the transmission stations and also in the receiving equipment.

For all the foregoing, it is desirable that the changes produced in the convolutional codes do not require changes in the uplink information bit rate.

The problems outlined hereabove are resolved by means of the method and the system for mapping uplink channels, in a time division multiplex (TDM) encoded and convolutional in the downlink direction, proposed by the present invention.

DESCRIPTION OF THE INVENTION

According to the invention, the changes in the convolutional codes in the downlink direction, and consequently in the information bit rate in the downlink direction, are offset by means of a change in the number of the uplink channels and not in the uplink information bit rate.

This objective is achieved by using selection criteria that are described further below in this description.

Thus an object of the invention is to provide a method for mapping channels into a convolutional encoded time division multiplex in the downlink, using at least one variable convolutional code rd, in a transmission system comprising a plurality of stations, each station transmitting in at least one channel, forming a plurality N of uplink channels being transmitted, at an uplink information bit rate Ru, towards a destination station, where said destination station transmits in at least one downlink channel at a downlink information bit rate Rd, in such a way that the relation $Rd=N*Ru$ is satisfied, characterised in that the number of uplink channels N varies as a function of a change in said code rd, in such a way that N is an integer multiple of said variable convolutional code rd.

According to one aspect of the invention, said method is also characterised in that rd is expressed as $rd=p/s$, where p and s are whole numbers, and the value of N is expressed as $N=mcm(s)*(p/s)$, where $mcm(s)$ represents the least common multiple of the values s.

According to another aspect of the invention said method is characterised in that $N*Ru=\Sigma M_j*Ru_j$; where $\Sigma M_j*Ru_j$ represents the sum of rates obtained as multiples of an initial rate $Ru_j$, and where $M_j$ is a whole number, equal or different in each case, of multiplication of the initial rate.

Another object of the invention is to provide a system for mapping channels, into a convolutional encoded time division multiplex in the downlink, using at least one variable convolutional code rd, in a transmission system comprising a plurality of stations, each station prepared for transmitting in at least one channel, forming a plurality N of uplink channels being transmitted, at an uplink information bit rate Ru, towards a destination station, where said destination station is prepared for transmitting in at least one downlink channel at a downlink information bit rate Rd, in such a way that the relation $Rd=N*Ru$ is satisfied, characterised in that the number of uplink channels N is an integer multiple of said variable convolutional code rd.

According to another aspect of the invention, said system is characterised in that it comprises a receiving antenna, at least one demultiplexer for demultiplexing the set of N channels received, at least one demodulator for demodulating the set of modulated channels, at least one multiplexer for multiplexing the N channels to be transmitted, at least one encoder of convolutional codes for applying convolutional codes to the multiplexed signal from the multiplexer and a transmitting antenna for transmitting a convolutionally encoded downlink channel.

According to an additional aspect of the invention, said system is characterised in that it also comprises at least one decoder for decoding the uplink channels.

These and other objects of the invention are described hereafter in greater detail with the assistance of the drawing attached.

BRIEF DESCRIPTION OF THE DRAWING

The single FIGURE attached is a simplified schematic diagram of a transmission system suitable for the embodiment of the present invention.

DESCRIPTION OF A PREFERRED EMBODIMENT

As can be seen in said FIGURE, a transmission system of the type of those that are employed for the implementation of the invention, as for example a satellite transmission system, comprises a receiving antenna 1, suitable for receiving radio communication over a plurality N of transmission channels $C_1, \ldots, C_N$ transmitted from a series of source stations, which in the case of satellite communication can be ground stations, for example for video broadcasting, with their respective antennas transmitting in the uplink direction. Said uplink channels $C_1, \ldots, C_N$ carry information, for example in digital transmission form, with an uplink information bit rate Ru. Consequently, a transmission of N uplink channels, that is $C_1, \ldots, C_N$, shall give rise to a total information bit rate of N*Ru. The channels $C_1, \ldots, C_N$ reach the receiving antenna 1 in multiplexed form. On being received by said receiving antenna 1, the channels are passed through a demultiplexer 2 to demultiplex said channels. Subsequently a demodulator 3 demodulates each one of the N channels.

Optionally, the channels $C_1, \ldots, C_N$ can have been transmitted with encoding for protection against errors in the uplink direction. In this case, a decoder 4 (shown enclosed by dashed lines in the FIGURE) serves to decode the error-protection codes of the uplink channels.

The downlink transmission part of the transmission system of the FIGURE comprises a multiplexer 5. Said multiplexer receives the N channels proceeding from the previous stages of the transmission system, each channel $C_1, \ldots, C_N$ having an uplink information bit rate Ru. Consequently, the total bit rate that is applied to the multiplexer 5 is equal to N*Ru. The multiplexer 5 produces, in turn, a single downlink channel with a downlink information bit rate of Rd.

In a symmetrical transmission, the total uplink information bit rate has to be equal to the total downlink information bit rate. That is, the following relation has to be satisfied:

$$N*Ru=Rd \tag{1}$$

The multiplexed signal produced by the multiplexer 5 is subsequently passed to a convolutional encoder 6 by means of which a convolutional code is applied to the downlink transmission signal. Subsequently said signal is fed to a transmitting antenna 7 that transmits the downlink channel $C_d$ which has a bit rate modified due to the convolutional codes by a convolutional rate factor rd. Consequently, the downlink channel $C_d$ shall have an information bit rate equal to Rd and a transmission bit rate that is expressed as Rd/rd. This latter rate is constant, therefore a change in rd compels Rd to change also by a reciprocal factor to that of the change occurred in rd. In practice the change in rd is due to the desired error protection.

Therefore if:

Rd/rd=K, where K is a constant;

then: Rd=K*rd

Substituting the value of Rd in relation (1) gives:

$$Ru*N=K*rd \tag{2}$$

In practice rd is always expressed in the form of a fraction of two whole numbers, like for example rd=p/s. Typical values of rd can be 1/2; 2/3; 3/4; 5/6, etc.

If the number of channels N is selected in such a way that the following relation is satisfied:

$$N=mcm(s)*rd, \tag{3}$$

where mcm(s) is the least common multiple of the different whole numbers s, this implies that N is always a whole number, which is desirable as it concerns the number of the uplink channels, and dependent on the factors s and p. Thus, N therefore depends on the value of rd.

As a consequence of the relation (3), a change in the value of rd is reflected in a relative change in the value of N, that is, in the number of uplink channels. The selection of the number of uplink channels is a task of relatively simple application for an expert in the art without arising the inconveniences mentioned in the state of the art.

Moreover, by applying the relation (3) in relation (2) the following is obtained:

$$Ru*mcm(s)*rd=K*rd,$$

which becomes:

$$Ru=K/mcm(s) \tag{4}$$

The foregoing provides a constant value for Ru; whereby there shall be no need to change the uplink information bit rate.

A practical example in the case of DVB is given herebelow:

where K=55 Mbit/s; and rd=1/2; 2/3; 3/4; 5/6 or 7/8;

the values of s are expressed as 2, 3, 4, 6 and 8.

Thus the least common multiple of the values s is equal to 24. Hence, the values of N are derived from the relation (3) giving the following result:

N=12, 16, 18, 20 or 21, respectively.

Furthermore, the relation (4) provides the value of Ru=55/24 Mbit/s, that is, a constant value.

A further advantage of the present invention is that in this way on-board frequency generation is simplified since there will be no need to use a clock for each convolutional code.

Optionally, the uplink information bit rate can be multiplied by a factor M, where M is a whole number like for example 1, 2, 3, 4, . . . , in such a manner that with an initial bit rate $Ru_i$, the total uplink information bit rate is the sum of different values multiples of the initial rate $Ru_i$. Thus the expression $\Sigma M_j * Ru_i$ represents the sum of the rates obtained as multiples of the initial rate $Ru_i$, where $M_j$ is a whole number, equal or different in each case, of multiplication of the initial rate. In this case the following relation must be satisfied:

$$\Sigma M_j * Ru_i = N * Ru,$$

where N*Ru is the value represented in the relation (1).

The practical result of this option is that in this manner the channels available can be distributed over different users depending on the service requirement of each one, while the total information bit rate remains unchanged.

What is claimed is:

1. Method for mapping channels into a convolutional encoded time division multiplex in the downlink, using at least one variable convolutional code rd, in a transmission system comprising a plurality of stations, each station transmitting in at least one channel, forming a plurality N of uplink channels being transmitted, at an uplink information bit rate Ru, towards a destination station, where said destination station transmits in at least one downlink channel at a downlink information bit rate Rd, in such a way that the relation Rd=N*Ru is satisfied, characterised in that the number of the uplink channels N varies as a function of a change in said code rd, in such a way that N is an integer multiple of said variable convolutional code rd.

2. Method according to claim 1, characterised in that rd is expressed as rd=p/s, where p and s are whole numbers, and the value of N is expressed as N=mcm(s)*(p/s), where mcm(s) represents the least common multiple of the values s.

3. Method according to claim 1, characterised in that $N*Ru = \Sigma M_j * Ru_i$; where $\Sigma M_j * Ru_i$ represents the sum of rates obtained as multiples of an initial rate $Ru_i$, and where $M_j$ is a whole number, equal or different in each case, of multiplication of the initial rate.

4. System for mapping channels into a convolutional encoded time division multiplex in the downlink, using at least one variable convolutional code rd, in a transmission system comprising a plurality of stations, each station adapted to transmit in at least one channel, forming a plurality N of uplink channels being transmitted, at an uplink information bit rate Ru, towards a destination station, where said destination station is adapted for transmitting in at least one downlink channel at a downlink information bit rate Rd, in such a way that the relation Rd=N*Ru is satisfied, characterised in that the number of the uplink channels N is an integer multiple of said variable convolutional code rd.

5. System according to claim 4, characterised in that it comprises a receiving antenna, at least one demultiplexer for demultiplexing the set of the N channels received, at least one demodulator for demodulating the set of modulated channels, at least one multiplexer for multiplexing the N channels to be transmitted, at least one encoder of convolutional codes for applying convolutional codes to the multiplexed signal from the multiplexer and a transmitting antenna for transmitting a convolutionally encoded downlink channel.

6. System according to claim 5, characterised in that it also comprises at least one decoder for decoding the uplink channels.

* * * * *